(12) United States Patent
Huang et al.

(10) Patent No.: US 10,936,667 B2
(45) Date of Patent: Mar. 2, 2021

(54) INDICATION OF SEARCH RESULT

(71) Applicant: EMC IP Holding Company LLC, Hopkinton, MA (US)

(72) Inventors: Kun Wu Huang, Shanghai (CN); Charlie Chen, Shanghai (CN); Winston Lei Zhang, Shanghai (CN); Jingjing Liu, Shanghai (CN); Duke Dai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 15/710,975

(22) Filed: Sep. 21, 2017

(65) Prior Publication Data

US 2018/0089335 A1    Mar. 29, 2018

(30) Foreign Application Priority Data

Sep. 23, 2016    (CN) .......................... 201610847713.0

(51) Int. Cl.
*G06F 16/9038*    (2019.01)
*G06F 16/93*    (2019.01)
*G06F 16/903*    (2019.01)

(52) U.S. Cl.
CPC .... *G06F 16/9038* (2019.01); *G06F 16/90344* (2019.01); *G06F 16/93* (2019.01)

(58) Field of Classification Search
CPC .... G06F 16/951; G06F 16/93; G06F 16/9038; G06F 16/90344
See application file for complete search history.

(56) References Cited

U.S. PATENT DOCUMENTS

| | | | |
|---|---|---|---|
| 10,038,709 B1 | 7/2018 | Wittenstein et al. | |
| 10,324,962 B1 | 6/2019 | Todd et al. | |
| 2004/0194141 A1* | 9/2004 | Sanders | H04N 21/4828 725/53 |
| 2007/0294306 A1* | 12/2007 | Toutonghi | G06F 16/58 |
| 2009/0052804 A1* | 2/2009 | Lewis | G06F 16/5846 382/298 |
| 2010/0115396 A1* | 5/2010 | Byron | G06F 16/954 715/234 |
| 2017/0308536 A1* | 10/2017 | Azzam | G06F 16/2425 |

* cited by examiner

*Primary Examiner* — Mahesh H Dwivedi
*Assistant Examiner* — Ken Hoang
(74) *Attorney, Agent, or Firm* — BainwoodHuang

(57) ABSTRACT

Embodiments of the present disclosure provide a solution for indicating a search result. A method of indicating a search result is disclosed, which includes, in response to receiving a query term, searching for an electronic document having metadata related to the query term. The method further includes, in response to the electronic document being searched, locating a metadata term matching with the query term from the metadata of the electronic document. The method further includes providing an indication highlighting the metadata term.

12 Claims, 8 Drawing Sheets

Fig. 4C

INDICATION OF SEARCH RESULT

RELATED APPLICATIONS

This application claim priority from Chinese Patent Application Number CN201610847713.0, filed on Sep. 23, 2016 at the State Intellectual Property Office, China, titled "INDICATION OF A SEARCH RESULT" the contents of which is herein incorporated by reference in its entirety.

FIELD

Embodiments of the present disclosure generally relate to text search, and more specifically, to an indication of a search result.

BACKGROUND

With rapid development of the Internet and database technology, there emerges a growing demand for information search. A search system or search engine may assist users in locating and retrieving information of interest. In a text-based search process, the search system receives a query term input by a user and searches related electronic documents with the query term. For example, if the user desires to search for contents related to "self-driving vehicle", the search system may retrieve electronic documents containing "self-driving vehicle" in the main bodies based on the received query term of "self-driving vehicle."

The search results of the search system may be provided to a user terminal and presented in a user interface of the terminal. However, as the number of search results is generally great and some electronic documents may contain a large amount of related or unrelated contents, it is desired to provide a method of presenting search results so that the user can locate the contents of interest from massive amounts of information quickly and in a convenient manner.

SUMMARY

Embodiments of the present disclosure provide a solution for indicating a search result.

In a first aspect of the present disclosure, a method of indicating a search result is provided. The method includes, in response to receiving a query term, searching for an electronic document having metadata related to the query term. The method also includes: in response to the electronic document being searched, locating a metadata term matching with the query term from the metadata of the electronic document. The method further includes providing an indication highlighting the metadata term.

In a second aspect of the present disclosure, an apparatus for indicating a search result is provided. The apparatus includes at least one processor and at least one memory including computer program code. The at least one memory and the computer program code are configured, with the at least one processor, to cause the apparatus to: in response to receiving a query term, search for an electronic document having metadata related to the query term; and in response to the electronic document being searched, locate a metadata term matching with the query term from the metadata of the electronic document. The at least one memory and the computer program code are configured, with the at least one processor, to further cause the device to provide an indication highlighting the metadata term.

In a third aspect of the present disclosure, a computer program product is provided. The computer program product is tangibly stored on a non-volatile computer readable medium and includes machine executable instructions. The machine executable instructions, when executed, cause a machine to perform the method according to the first aspect.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refers to the like elements in the example embodiments of the present disclosure.

FIGS. 4A to 4C are schematic diagrams illustrating a user interface at a terminal in accordance with embodiments of the present disclosure;

DETAILED DESCRIPTION OF EMBODIMENTS

Figure 1:
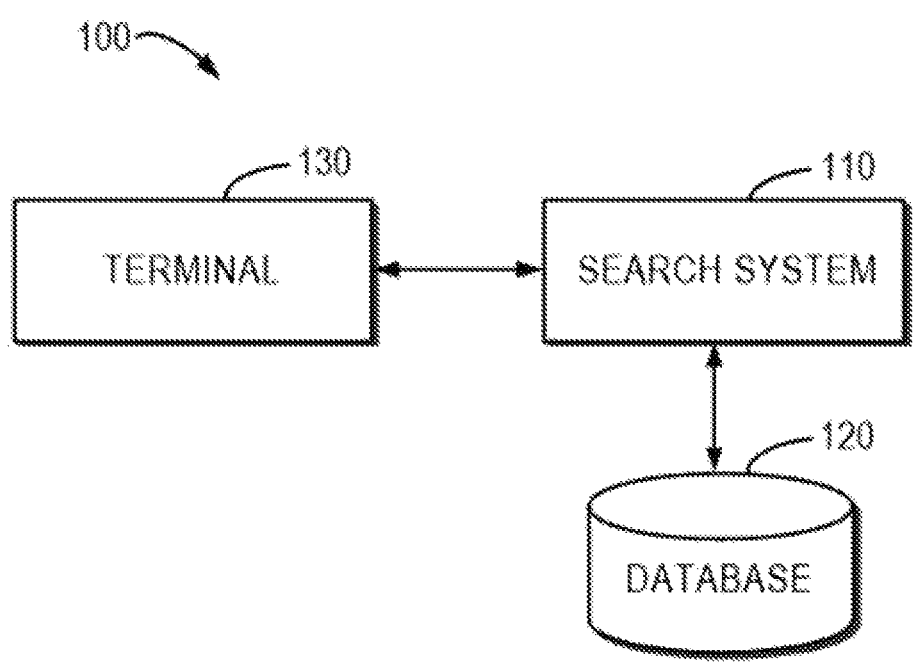
FIG. 1 is a diagram illustrating an environment in which various embodiments of the present disclosure can be implemented.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "another embodiment" is to be read as "at least one other embodiment." The terms "first," "second," and the like may refer to different or same objects. The terms "information," "data," and "content" may be used interchangeably. Other definitions, explicit and implicit, may be included below.

FIG. 1 is a diagram illustrating an environment 100 in which various embodiments of the present disclosure can be implemented. The environment 100 includes a search system 110 for providing a search service. The search system 110 can be connected to a database 120 for storing electronic documents to be searched, so as to retrieve electronic documents of interest therefrom. As used herein, the term "electronic document" refers to any document in a machine-readable format, including, but not limited to, pdf files, txt files, various office files, various webpage files, e-mails, and the like. The database 120 may be any type of database providing data sources, such as an enterprise database, a website database, a personal website, and the like. Although only one database 120 is shown, in other example embodiments, the search system 110 may access a plurality of databases having electronic documents stored thereon.

The terminal 130 may query the electronic document desired to be accessed using the search system 110. For example, the terminal 130 may send a query term input from a user to the search system 110. The search system 110 may search for related electronic documents in the database 120 based on the query term, and provide to the terminal 130 the searched electronic documents, previews of the documents, or their accessible addresses. The terminal 130 may be any type of mobile terminal, a fixed terminal or a portable terminal.

The terminal 130 and/or database 120 may be connected wiredly and/or wirelessly to the search system 110. The database 120 may be a local storage device of the search system 110 or may be communicated with the search system 110 via a network. Further, although shown as being separated from the terminal 130, the search system 110 may also be embedded into the terminal 130.

When the search results, such as the searched electronic documents, are provided to the terminal 130, the search system 110 may indicate a presentation mode of the search result in the user interface of the terminal 130. In order to enable the user to locate contents of interest quickly and conveniently from the search result, one possible solution is that the search system 110 may indicate the contents to be highlighted in the search result.

In some traditional solutions with highlighting display, the search system 110 may identify the contents matching the query term of the user from the texts of the electronic documents (also referred to as text data), and instruct the user interface of the terminal 130 to highlight the contents. Highlighting the search result allows the user to more quickly notice the contents of interest or to determine the relevancy of a search result to the query information. For example, if the search system 110 retrieves a webpage related to "self-driving vehicle", all the phrases of "self-driving vehicle" included in that webpage are highlighted when the webpage is presented as a search result.

However, such highlighting may miss some contents about which the user concerns. In many cases, the user may not only desire to search for text data of an electronic document, but also expect to obtain additional information that is not presented within the text data, such as the author, format, creation date, updated date, keyword(s), comment(s), and the like. Such additional information is collectively called metadata and typically stored in association with the electronic document. For example, in the case of document co-processing, an electronic document may be co-edited, modified, and checked by multiple users, and different users may add lots of valuable comments into the metadata associated with the electronic document. The user who searches for the electronic document may want to check this part of metadata.

The inventors have discovered that, although there have been existed search techniques that can retrieve electronic documents having metadata of interest as required, those techniques cannot highlight the associated metadata for the user. As a result, the user still fails to quickly notice from the search result the metadata content him/her wants to search for or cannot determine the relevancy of the metadata section of the searched electronic document to the query information.

In some other cases, the text data of an electronic document may be organized in a structured data format, such as an extendable markup language (XML) format, and may be stored in a similar way as the metadata (and thus there is no text data at all conceptually). In this case, there are problems in highlighting the text data and the metadata for this type of electronic documents.

Figure 2:
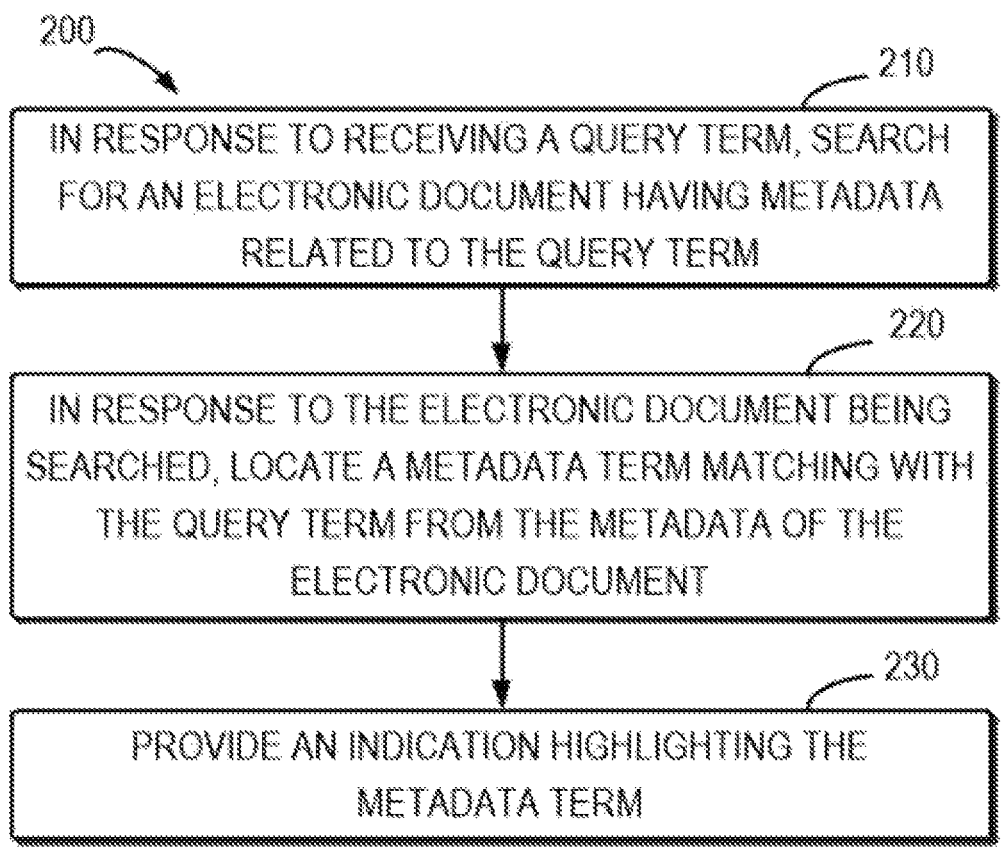
FIG. 2 is a flowchart illustrating a method of indicating a search result in accordance with an embodiment of the present disclosure.

In accordance with example embodiments of the present disclosure, there is provided a solution for indicating a presentation of a search result. The solution directs to highlighting metadata of an electronic document. FIG. 2 is a flowchart of a method of indicating a search result 200 in accordance with an embodiment. The method 200 may be implemented by a search system, such as the search system 110.

At 210, in response to receiving a query term, an electronic document having metadata related to the query term is searched. Typically, the electronic document may include text data and has associated metadata. The text data is content that is actually recited in the electronic document In some cases, the electronic document may be a blank document, and the section of text data is thus empty. The metadata may be stored in association with the text data of the electronic document (for example, stored as an individual file), and may indicate various additional information related to the electronic document, such as the author, format, creation date, updating date, keyword(s), comment(s), and the like.

It would be appreciated that, the specific contents included in the metadata of the electronic document are not limited in the embodiments of the present disclosure because this type of data may be added or deleted in any manner if required. Any information that is not recorded in the text of an electronic document but stored and provided otherwise in association therewith may be referred to as metadata of the electronic document.

Figure 3:
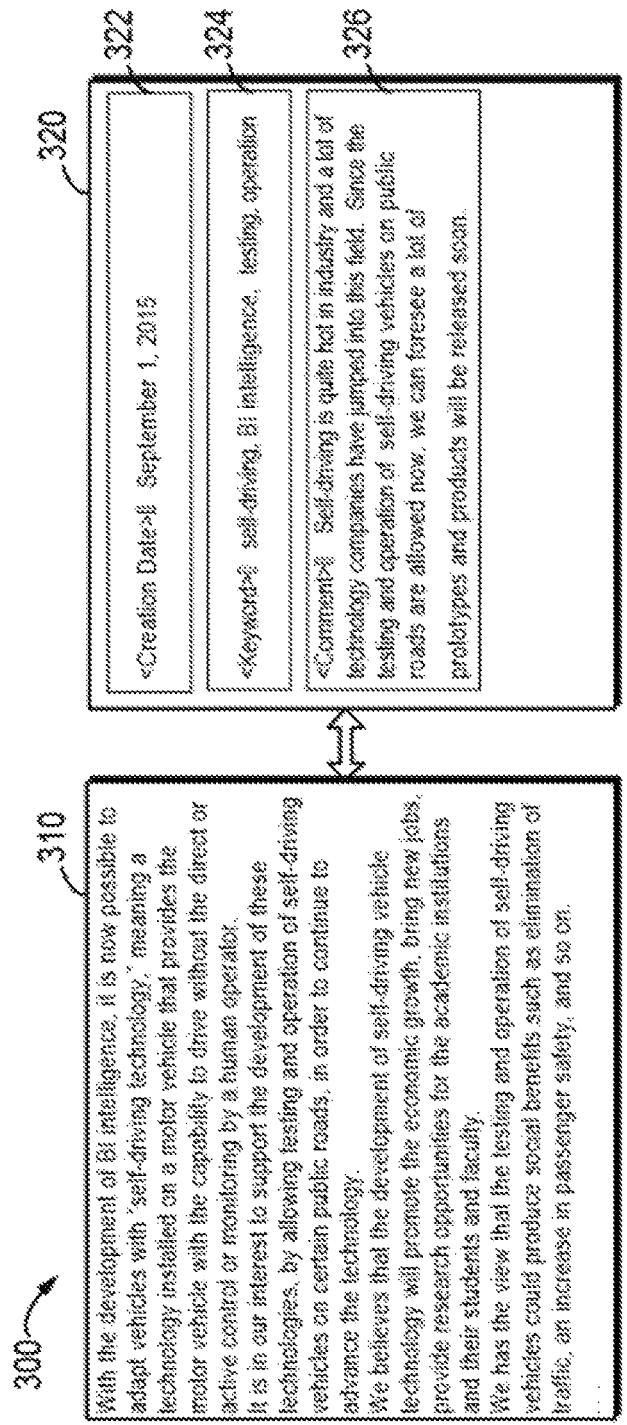
FIG. 3 is a diagram illustrating an example electronic document in accordance with an embodiment of the present disclosure.

Different types of metadata may be stored in different data fields. For example, the metadata may include respective data fields corresponding to the author, format, creation date, updating date, keyword(s), and comment(s). These data fields may be modified, added and updated individually. It would be appreciated that metadata of different electronic documents may not include all but only one or some of the data fields. FIG. 3 illustrates an example 300, including an electronic document 310 recording text data and its associated metadata 320. The metadata 320 further includes a creation date field 322, a comment field 324, and a keyword field 326.

In addition to the text data of the electronic document, the search system 110 may also access the metadata of the electronic document and determine whether the metadata is related to the query term. The query term may be input from the user (for example, the user of the terminal 130) and may be obtained by the search system 110. The query term may include a key character, word, phase, sentence, character string, and/or the like that is queried by the user, and its format may be varied depending on configurations of different search systems. Upon receiving the query term, the search system 110 may analyze the query term so as to search for the electronic document including the content related to the query term from the connected database 120. Herein, be "associated" with the query term may indicate that the electronic document includes one, some, or all of the characters, words, phrases, or variants thereof in the query term.

In some embodiments, the received query term may be identified as being related to the metadata. The search system 110 may thus directly search for the metadata associated with the search term from the metadata associated with the electronic document which is to be searched or being searched. For example, upon inputting a query term, the user of the terminal 130 may specify whether the query term is a query term for the metadata or the text data. The terminal 130 may provide a specified user interface including different input areas for receiving query terms for the metadata or for the text data from the user. If a query term is received from the input area for the metadata, the terminal 130 may identify that the query term is associated with the metadata and transmit it to the search system 110. Further, the query term may be identified as being associated with a certain data field(s) of the metadata (for example, when input areas are provided for different data fields), and the search system 110 may thus search for the data related to the query term from the specified data field(s) of the metadata of each electronic document to be searched.

In some embodiments, a plurality of query terms for the metadata may be received. Depending on the requirements on accuracy imposed by the user or the search system 110, the search system 110 may search for an electronic document having metadata related to all the query terms, or may search for an electronic document having metadata related to one or some of the query terms.

In some other embodiments, the search system 110 may receive a first query term(s) for metadata and a second query term(s) for text data, and thus may search for an electronic document satisfying one or two requirements, including an electronic document having metadata related to the first query term(s) and/or text data related to the second query term(s). Alternatively, a query term may not be particularly specified as being associated with the metadata. In this case, the search system 110 may search for both the text data and the associated metadata of the electronic document to be searched.

Figure 4A:
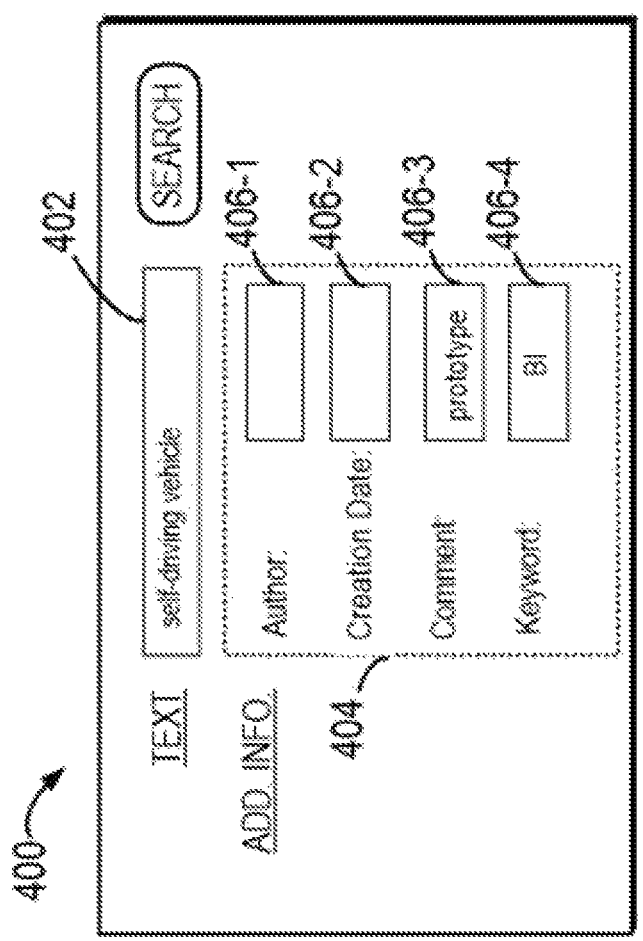

FIG. 4A illustrates a user interface 400 for receiving a query term(s) at the terminal 130. The user interface 400 includes an input area 402 for receiving a query term for text data and an input area 404 for receiving a query term for metadata. Further, in the input area 404, some particular input blocks for different types of metadata (different data fields) are provided, including an input block 406-1 for an author field, an input block 406-2 for a creation date field, an input block 406-3 for a comment field, an input block 406-4 for a keyword field, and the like.

If the user wants to search for electronic documents including "self-driving vehicle" in their text data and having additional information with a comment of "prototype" and a keyword of "BI", he/she may input "self-driving vehicle" in the input block 402, "prototype" in the input block 406-3 for the comment, and "BI" in the input block 406-4 for the keyword. As a result, the terminal 130 may obtain a query term "self-driving vehicle" for the text data and the respective query terms "prototype" and "BI" for the comment field and keyword field in the metadata, and provide those query terms to the search system 110.

It would be appreciated that only an example user interface and a manner of receiving query terms are illustrated in FIG. 4A, and various different user interfaces for receiving the query terms may be designed in other implementations. In other examples, instead of providing multiple different input areas for different query terms, the user may input, for example "searching for an electronic document including 'self-driving vehicle' in its text and having additional information with a comment of 'prototype' and a keyword of 'BI'." The terminal 130 or the search system 110 may determine the search intention of the user by analyzing the input, and obtain the corresponding query terms.

The search system 110 may search for the metadata (and text data if necessary) of electronic documents using various search techniques. Embodiments of the present disclosure are not limited in this regard. Once the query term (or variants thereof) is searched in the metadata of a certain electronic document, the search system may determine that the query term is related to the metadata. The search system 110 may also determine that the query terms are related to the metadata or has a high relevancy when a certain number of query terms in all the query terms are found therein. The embodiments of the present disclosure are not limited in the aspect of determining the relevancy of the metadata to the query term(s).

In embodiments of the present disclosure, for an electronic document searched by the search system 110 as having metadata related to the query term(s), it is desired that certain contents for the metadata can be highlighted. Therefore, at 220, in response to the electronic document having the metadata related to the query term being searched at 210, a metadata term matching with the query term is located in the metadata of the electronic document. The metadata term may be one or more characters, words, phrases, and/or sentences included in the metadata.

For purpose of highlighting, the content needed to be highlighted is first located in the metadata. Conventionally, the highlighting is to emphasize partial content in the electronic document about which the user concerns so that the user can quickly and conveniently notice that partial content. In the search scenario, it can be determined that the part about which the user concerns the most is the content matching with the query term. Accordingly, after the search system 110 retrieves the metadata related to the search term, for subsequent highlighting of a metadata term, the location of the metadata term matching with the query term may be determined in the metadata.

As used herein, "matching" indicates that the query term is exactly identical or similar to the metadata term. For example, in the case of "similar" terms, one or more characters, words, or phrases in the located metadata term may be some variant(s) of corresponding characters, words, or phrases in the query term. As a specific example, in an electronic document in English, the metadata term may include one or more words of the query term in different tenses, singular, or plural forms. Typically, the located metadata term is the term that is used for determining the relevancy of the metadata to the query term when being searching by the search system 110 at the search phase. In some embodiments, the search system 110 may locate one or some metadata terms matching with the query term in the metadata. Alternatively, the search system 110 may locate all the matching metadata terms.

In some embodiments, as mentioned above, metadata of an electronic document may include a plurality of data fields, and a query term may be identified as being related to one or some of the data fields included therein. Thus, prior to locating the metadata term(s), it may be determined that with which data field(s) the query term is associated. If it is determined that the query term is associated with one or more specific data field(s), the matched metadata term(s) is located in the determined data field(s). This may improve the efficiency of the locating and reduce the calculating complexity. For example, it is supposed that a query term "prototype" for the metadata is identified as being associated with the comment field, and the matched metadata term may be located from the comment field.

In order to locate the metadata term, in some embodiments, the search system 110 may process the metadata to obtain indices. An index may be referred to as a "token" which may be associated with at least one metadata term included in the metadata. In some example embodiments, in order to obtain the indices or tokens, it may need to perform operations such as segmenting, voice analysis, and the like may need to be performed on the metadata to properly understand the actual meaning of the metadata and discard words such as auxiliary verbs, function words, and other words that has no contribution to the meaning. For example, by performing segmenting and voice analysis on the sentence "Self-driving is quite hot in industry and a lot of technology companies have jumped into this field," an index "technology company" may be determined, which corresponds to a metadata term "technology companies" in the sentence. The search system 110 may locate the matched metadata term based on the indices. For example, the query term may be compared to the index. The metadata term corresponding to the index may be searched if matched.

Processing the metadata to obtain the indices may be similar to traditional processing on the text data. Conventionally, in order to highlight the text data, a text term(s) matching with the corresponding query term may also be located from the text data. However, since the size of the text data is typically large, in order to improve the performance, the text data is usually pre-processed to obtain the indices, and the obtained indices are stored (for example, in the database 120 or other storage spaces accessible to the search system 110) for use during the locating. Thus, the storage space may be consumed.

Due to the characteristics of the metadata, it may be unnecessary to pre-process the metadata with the cost of the storage space, but may process the metadata in real time as needed. More particularly, as compared to the text data, the size of the metadata of the electronic document is generally small (for example, the metadata may only include several words or sentences). In this case, the processing speed may not be reduced even though the metadata is processed in real time. In addition, for multiple different data fields of the metadata, the user may only care about and desire to search for some rather than all of the fields. Therefore, it is unnecessary to continue pre-processing all types of the metadata and storing the indices, so as to avoid a waste of the storage space and processing resources.

In some embodiments, the processing for obtaining the indices may occur at the search phase. In order to determine whether the metadata is related to the query term, the search system 110 may employ an index-based searching method; that is, the metadata is processed first to obtain the indices, and the index corresponding to the query term is retrieved. In these embodiments, the search system 110 may determine the location of the corresponding metadata term in a more easy way during the locating.

It would be appreciated that, if the searched text data of the electronic document includes a text term(s) matching with the corresponding query term (which is identical to the query term of the metadata or not), the search system 110 may also locate the text term(s).

Still referring to FIG. 2, at 230, an indication highlighting the located metadata term is provided. The search system 110 may instruct the terminal requesting for the retrieving, for example, the terminal 130 to highlight the metadata term. As used herein, "highlight" may be referred to visually emphasize the matched metadata term included in the metadata. Various manners may be used to highlight the located metadata term. For example, attributes may be applied to the located metadata, such as a boxing attribute, coloring attribute, bolding attribute, or other attributes that can distinguish the located metadata term from the remaining metadata. The manner of the highlighting may be instructed by the search system 110 to the terminal 130, or pre-selected by the user of the terminal 130. By means of highlighting, the user can identify the content of interest included in the metadata of the electronic document conveniently.

In some embodiments, the search system 110, when providing a search result to the terminal 130, may initially instruct the terminal 130 to present preview information, rather than all of the result, which preview information may be, for example, a part of the metadata of the searched electronic document. In order to highlight the metadata term matching with the query term, the search system 110 identifies a segment of the metadata (also referred to as a first segment) that includes the located metadata term, so as to form the preview information for presentation. In addition to the metadata term, the identified section may include some contents preceding and/or following the metadata term, such that the user can learn some context of the metadata term from the preview information.

If there are a plurality of located metadata terms, a plurality of corresponding segments may be identified to configure the preview information. These segments may be continuous or non-continuous. In some example embodiments, the length and/or the numbers of the identified segments may be determined based on the length of the preview information that can be presented. The search system 110 may provide to the terminal 130 an indication highlighting the metadata term(s) in the presentation of the identified section(s). Based on this indication, the terminal 130 may present the identified segment(s) in its user interface with the metadata term(s) matching with the query term highlighted therein.

For the text data of the electronic document, the search system 110 may similarly provide preview information and instruct the terminal 130 to highlight the matched text term(s) in the preview information. Specifically, after locating a text term matching with the corresponding query term in the text data of the electronic document, the search system 110 may identify a segment of the text data (for example, a second segment) including the located text term. The search system 110 may merge the first segment identified from the metadata with the second segment identified from the text data as the preview information, and may provide an indication of presenting the merged first and second segments. In addition, the matched metadata term and text term are highlighted in the presentation.

Figure 4B:
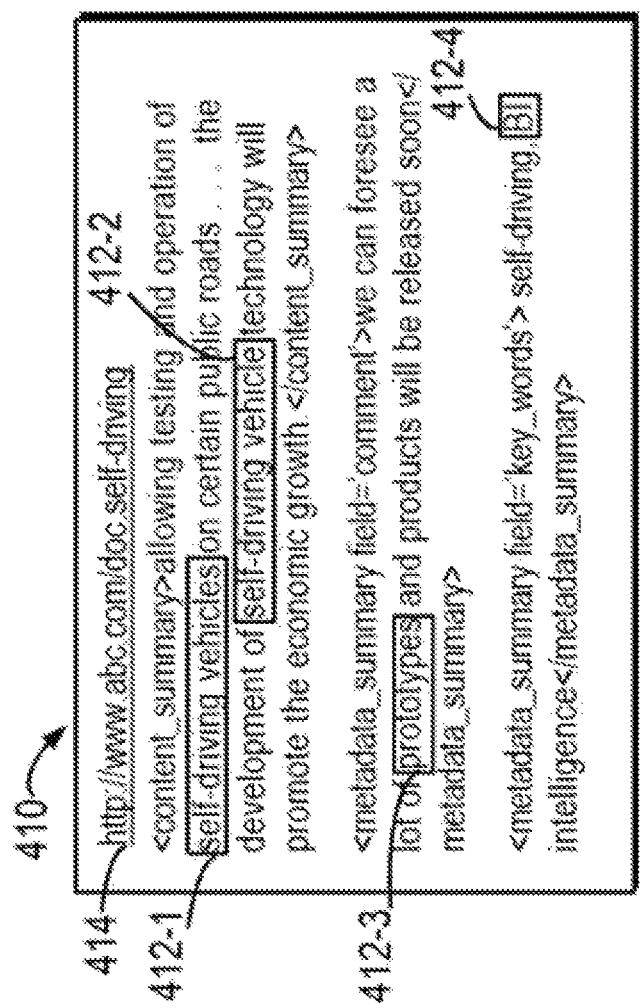

As a specific example, the search system 110 searches for an electronic document 310 upon receiving the query terms as shown in FIG. 4A. The search system 110 then identifies respective segments including the matched text terms and metadata terms from the text data of the electronic document 310 and the associated metadata 320 to form preview information. The search system 110 provides to the terminal 130 an indication highlighting the matched text terms and metadata terms in the presentation of the preview information. FIG. 4B illustrates a user interface 410 for highlighting the metadata terms and text terms after the terminal 130 receives the indication.

As shown, the text terms "self-driving vehicles" and "self-driving vehicle" occurring in a part of text data of the electronic document are highlighted in block signs 412-1 and 412-2, respectively. In addition, the metadata term "prototypes" in the comment field and the metadata term "BI" in the keyword field of the metadata are highlighted by block signs 412-3 and 412-4, respectively. Through the presentation mode as shown in the user interface 410, the user may not only quickly notice the content of interest in the text data of the searched electronic document, but also may notice the content matching with the query term in the metadata and thus determine that the metadata section of the electronic document also has a high relevancy to the query term.

In addition to providing the highlighting in the preview information, or as an alternative, the search system 110 may provide to the terminal 130 an indication highlighting the matched metadata terms in the presentation of all the metadata. In this case, more matched metadata terms may be highlighted if any. At this time, although more contents are presented, the user can still conveniently locate those matched contents from a large amount of information by means of the highlighting.

The search system 110 may actively provide such indication to the terminal 130. Alternatively, or in addition, the search system 110 may provide the indication as a response to a request or setting. In some cases, after presenting the preview information, the user may want to view the full contents of the metadata of the electronic document. The user may send a request by clicking on the address of the electronic document or in other manners. Similarly, the search system 110 may provide an indication highlighting the matched text terms in the presentation of the whole text data. This indication may be provided actively or as a response to the request (setting).

For example, in FIG. 4B, the user may click on an address 414 of the electronic document corresponding to the preview information displayed in the user interface 410. In response to the operation of the user, the terminal 130 may send to the search system 110 an indication of requesting display of the whole text data and whole metadata content of the electronic document. It would be appreciated that, in other example embodiments, respective request may be initiated for the whole text content or metadata content of the electronic document, and the search system 110 may accordingly respond to the request with the respective indication.

Figure 4C:
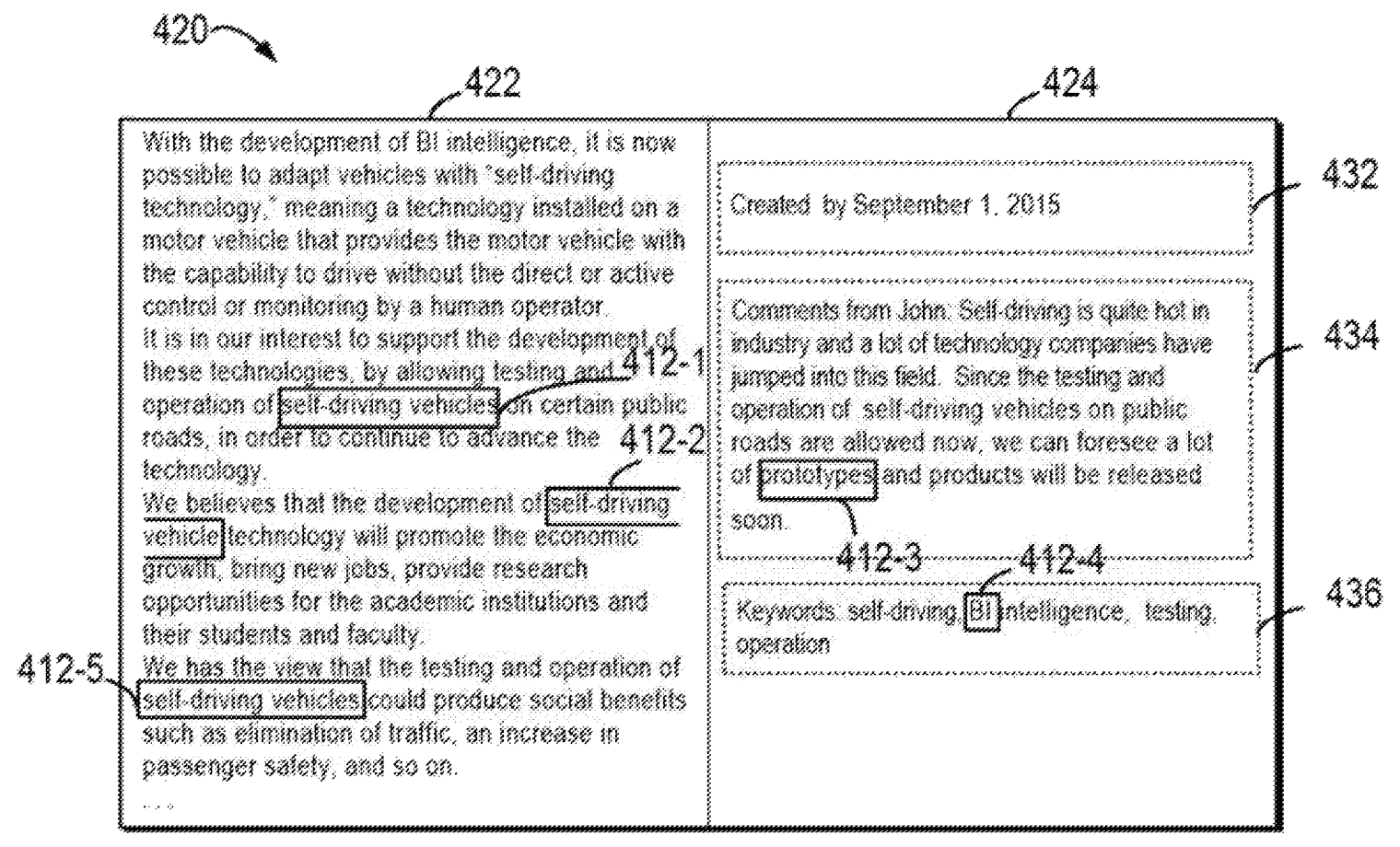

Upon receiving the indication of the search system 110, the terminal 130 may present the full content (the metadata and/or text data) to the user, and highlight the matched terms in the presentation. FIG. 4C illustrates a user interface 420 at the terminal 130 for highlighting the matched terms in the full display of the electronic document. The user interface 420 may include a presentation 422 for the text data of the electronic document 310 and a presentation 424 for the metadata 320. In the presentation 424, data corresponding to the respective data fields 322-326 of the metadata is displayed, including a creation date 432, comments 434, and keywords 436.

In the presentation 422, in addition to the text terms highlighted by block signs 412-1 and 412-2 in the presentation of the preview information, an additional matched text term identified by the block sign 412-5 is also highlighted. In the presentation 424, the matched metadata term in the comment data 434 and the keyword data 436 are respectively emphasized by the blocks 412-3 and 412-4.

According to embodiments of the present disclosure, a solution is provided for highlighting metadata in a search result. Such solution makes up the deficiencies in the existing search-result presenting solutions, so that the user can locate terms of interest in each section content of an electronic document of a search result quickly and conveniently. Moreover, this solution can be applied to electronic documents stored in various structured formats, so it is possible to highlight the text data and additional metadata of documents in all types.

Figure 5:
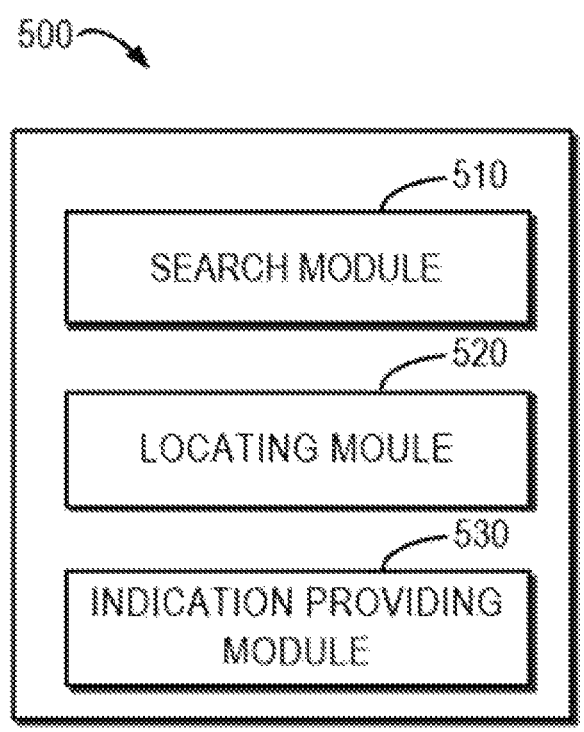
FIG. 5 is a block diagram illustrating an apparatus for indicating a search result in accordance with an embodiment of the present disclosure.

FIG. 5 illustrates an apparatus for indicating a search result 500 in accordance with embodiments of the present disclosure. The apparatus 500 may implement the search system 110 of FIG. 1 or may be part of the search system 110. As shown, the apparatus 500 may include a search module 510 configured to, in response to receiving a query term, search for an electronic document having metadata related to the query term. The apparatus 500 also includes a locating module 520 configured to, in response to the electronic document being searched, locate a metadata term matching with the query term from the metadata of the electronic document. The apparatus 500 further include an indication providing module 530 configured to provide an indication highlighting the metadata term.

In some embodiments, the locating module 520 is configured to determine that the query term is associated with at least one of a plurality of data fields of the metadata; and locate a metadata term matching with the query term from the determined at least one data field.

In some embodiments, the locating module 520 is configured to process the metadata to obtain an index, the index being associated with at least one metadata term included in the metadata; and locate, based on the obtained index, a metadata term matching with the query term.

In some embodiments, the apparatus 500 further includes an identification module configured to identify a first segment of the metadata that includes the located metadata term. The indication providing module 530 is configured to provide an indication highlighting the metadata term in a presentation of the first segment.

In some embodiments, the electronic document includes text data matching with a further received query term. In some embodiments, the locating module 520 is configured to locate a text term matching with the further query term from the text data of the electronic document and identify a second segment of the text data that includes the located text term. The apparatus 500 further includes a merging module configured to merge the first segment with the second segment. The indication providing module 530 is further configured to provide an indication of a presentation of the merged first and second segments, the metadata term and the text term being highlighted in the presentation of the merged first and second segments.

In some embodiments, the indication providing module 530 is configured to provide an indication highlighting the metadata term in a presentation of the metadata.

Figure 6:
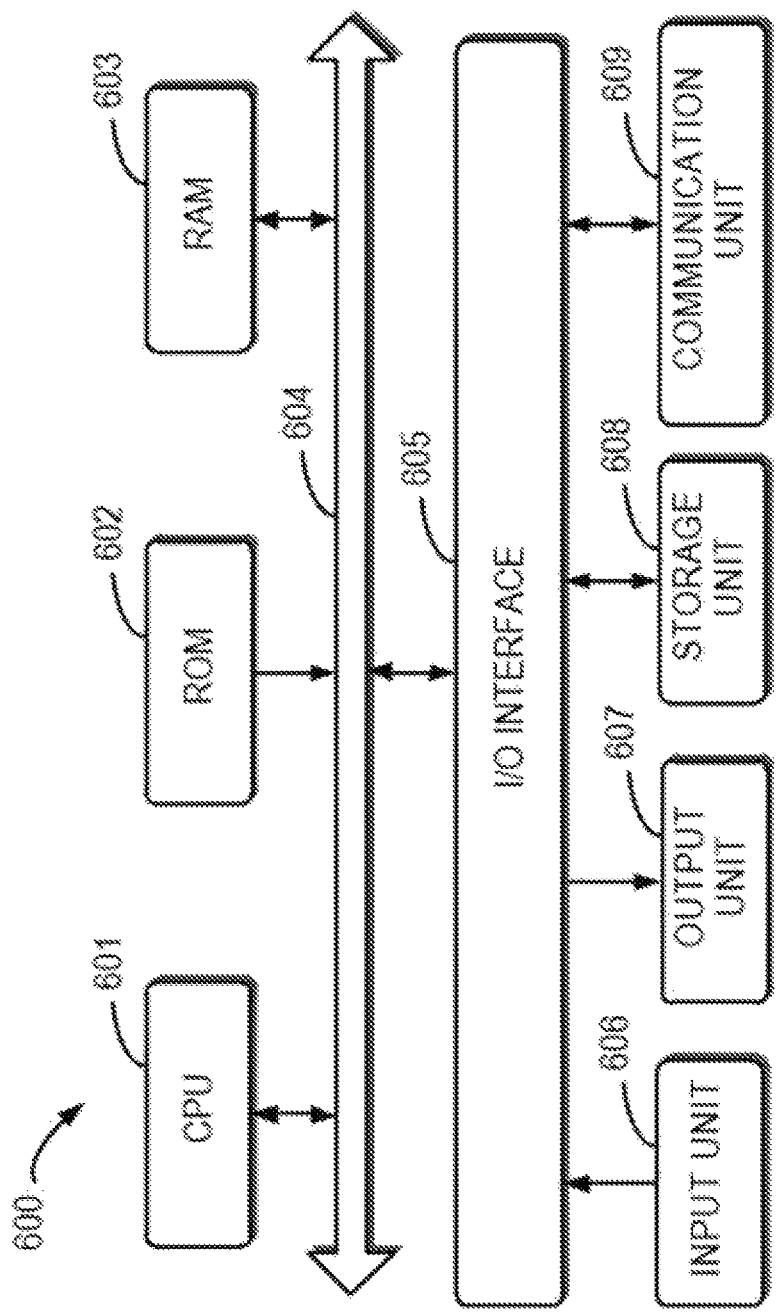
FIG. 6 is a block diagram illustrating an example device for implementing embodiments of the present disclosure.

FIG. 6 is a schematic block diagram for implementing an example device 600 for implementing embodiments of the present disclosure. The device 600 may implement the search system 110 of FIG. 1 or may be part of the search system 110. As shown, the device 600 includes a central processing unit (CPU) 601 which is capable of performing various suitable actions and processes in accordance with computer program instructions stored in a read-only memory (ROM) 602 or loaded to a random access memory (RAM) 603 from a storage unit 608. In the RAM 603, various programs and data required for operations of the device 600 may also be stored. The CPU 601, ROM 602 and RAM 603 are interconnected via a bus 604. An input/output (I/O) interface 604 is also connected to the bust 604.

Various components in the device 600 are connected to the I/O interface 605, including an input unit 606, such as a keyboard, mouse, and the like; an output unit 607 such as various displays, loudspeakers, and the like; a storage unit 608 such as a magnetic disk, an optical disk, and the like; and a communication unit 609 such as a network card, a modem, a radio communication transceiver, and the like. The communication unit 609 enables the device 600 to communicate information/data with other devices via a computer network such as Internet, and/or various telecommunication networks.

Various methods and processing described above, such as the method 200, may be implemented with the processing unit 701. For example, in some embodiments, the method 200 may be implemented as a computer software program which is tangibly included in a machine readable medium, such as a storage unit 608. In some embodiments, part or all of the computer programs may be loaded and/or installed to the device 600 via the ROM 602 and/or communication unit 609. When the computer program is loaded to the RAM 603 and executed by the CPU 601, one or more steps of the method 200 described above may be performed. Alternatively, in other embodiments, the CPU 601 may be configured to perform the method 200 in any other appropriate manners (e.g., by means of firmware).

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of indicating a search result, comprising:
   receiving a search request from a user, the search request including:
      a metadata query term requested to be searched for within metadata of a plurality of electronic documents and
      a text data query term requested to be searched for within non-metadata text data of the plurality of electronic documents;
   in response to receiving the search request, searching for an electronic document of the plurality of electronic documents having both (a) metadata related to the metadata query term and (b) text data matching with the text data query term;
   in response to a particular electronic document being located by the searching, locating a metadata term matching with the metadata query term from the metadata of the electronic document and locating a text term matching with the text data query term from the text data of the electronic document; and
   providing an indication highlighting the metadata term and the text term, including:
      identifying a first segment of the metadata that includes the located metadata term, including identifying a first sequence within the metadata that includes the located metadata term as well as additional metadata preceding the located metadata term and following the located metadata term within the metadata, the first segment including less than all of the metadata of the electronic document;
      identifying a second segment of the text data that includes the located text term, including identifying a second sequence within the text data that includes the located text data term as well as additional text data preceding the located text data term and following the located text data term within the text data, the second segment including less than all of the text data of the electronic document;
      merging the first segment with the second segment; and
      providing a display of a presentation of the merged first and second segments, the metadata term and the text term being highlighted in the presentation of the merged first and second segments, wherein providing the display of the presentation of the merged first and second segments includes displaying less than an entirety of the metadata of the electronic document and less than an entirety of the text data of the electronic document.

2. The method of claim 1, wherein locating a metadata term matching with the metadata query term comprises:
   determining that the metadata query term is associated with at least one of a plurality of data fields of the metadata; and
   locating a metadata term matching with the metadata query term from the determined at least one data field.

3. The method of claim 1, wherein locating a metadata term matching with the metadata query term comprises:
   processing the metadata to obtain an index, the index being associated with at least one metadata term included in the metadata; and
   locating, based on the obtained index, a metadata term matching with the metadata query term.

4. The method of claim 1, wherein the metadata includes additional information associated with a search intention of the user.

5. The method of claim 1,
   wherein the search request is received via an input device of a computerized environment;
   wherein the electronic document and the metadata of the electronic document reside in memory of the computerized environment, the metadata term being located in response to the electronic document and the metadata being accessed from the memory; and
   wherein providing the indication highlighting the metadata term includes identifying the metadata term using a user interface of the computerized environment.

6. The method of claim 1 wherein the metadata is selected from:
- an author of the electronic document;
- a format of the electronic document;
- a creation date of the electronic document;
- an updated date of the electronic document;
- one or more keywords describing the text data of the electronic document; and
- one or more comments about the text data of the electronic document.

7. An apparatus for indicating a search result, comprising:
- at least one processor; and
- at least one memory including computer program code, wherein the at least one memory and the computer program code are configured, with the at least one processor, to cause the apparatus to:
  - receive a search request from a user, the search request including:
    - a metadata query term requested to be searched for within metadata of a plurality of electronic documents and
    - a text data query term requested to be searched for within non-metadata text data of the plurality of electronic documents;
  - in response to receiving the search request, search for an electronic document of the plurality of electronic documents having both (a) metadata related to the query term and (b) text data matching with the text data query term;
  - in response to a particular electronic document being located by the searching, locate a metadata term matching with the metadata query term from the metadata of the electronic document and locate a text term matching with the text data query term from the text data of the electronic document;
  - provide an indication highlighting the metadata term and the text term, including:
    - identifying a first segment of the metadata that includes the located metadata term, including identifying a first sequence within the metadata that includes the located metadata term as well as additional metadata preceding the located metadata term and following the located metadata term within the metadata the first segment including less than all of the metadata of the electronic document;
    - identifying a second segment of the text data that includes the located text term, including identifying a second sequence within the text data that includes the located text data term as well as additional text data preceding the located text data term and following the located text data term within the text data, the second segment including less than all of the text data of the electronic document;
    - merging the first segment with the second segment; and
    - providing a display of a presentation of the merged first and second segments, the metadata term and the text term being highlighted in the presentation of the merged first and second segments, wherein providing the display of the presentation of the merged first and second segments includes displaying less than an entirety of the metadata of the electronic document and less than an entirety of the text data of the electronic document.

8. The apparatus of claim 7, wherein the at least one memory and the computer program code are configured, with the at least one processor, to cause the apparatus to:
- determine that the metadata query term is associated with at least one of a plurality of data fields of the metadata; and
- locate a metadata term matching with the metadata query term from the determined at least one data field.

9. The apparatus of claim 7, wherein the at least one memory and the computer program code are configured, with the at least one processor, to cause the apparatus to:
- process the metadata to obtain an index, the index being associated with at least one metadata term included in the metadata; and
- locate, based on the obtained index, a metadata term matching with the metadata query term.

10. A computer program product for indicating a search result, the computer program product comprising a non-transitory computer readable medium encoded with computer-executable program code for indicating the search result, wherein the code is configured to enable the execution of:
- receiving a search request from a user, the search request including:
  - a metadata query term requested to be searched for within metadata of a plurality of electronic documents and
  - a text data query term requested to be searched for within non-metadata text data of the plurality of electronic documents;
- in response to receiving the search request, searching for an electronic document of the plurality of electronic documents having both (a) metadata related to the metadata query term and (b) text data matching with the text data query term;
- in response to a particular electronic document being located by the searching, locating a metadata term matching with the metadata query term from the metadata of the electronic document and locating a text term matching with the text data query term from the text data of the electronic document; and
- providing an indication highlighting the metadata term and the data term, including:
  - identifying a first segment of the metadata that includes the located metadata term, including identifying a first sequence within the metadata that includes the located metadata term as well as additional metadata preceding the located metadata term and following the located metadata term within the metadata the first segment including less than all of the metadata of the electronic document;
  - identifying a second segment of the text data that includes the located text term, including identifying a second sequence within the text data that includes the located text data term as well as additional text data preceding the located text data term and following the located text data term within the text data the second segment including less than all of the text data of the electronic document;
  - merging the first segment with the second segment; and
  - providing a display of a presentation of the merged first and second segments, the metadata term and the text term being highlighted in the presentation of the merged first and second segments, wherein providing the display of the presentation of the merged first and second segments includes displaying less than an entirety of the metadata of the electronic document and less than an entirety of the text data of the electronic document.

11. The computer program product of claim 10, wherein locating a metadata term matching with the metadata query term comprises:
- determining that the metadata query term is associated with at least one of a plurality of data fields of the metadata; and
- locating a metadata term matching with the metadata query term from the determined at least one data field.

12. The computer program product of claim 10, wherein locating a metadata term matching with the metadata query term comprises:
- processing the metadata to obtain an index, the index being associated with at least one metadata term included in the metadata; and
- locating, based on the obtained index, a metadata term matching with the metadata query term.

* * * * *